United States Patent Office 3,576,906
Patented Apr. 27, 1971

3,576,906
RESIN PROVIDING COMPOSITIONS COMPRISING A REACTION PRODUCT OF AN EPIHALOHYDRIN POLYMER AND A MERCAPTO-ALKANOL
Richard A. Hickner and Hugh A. Farber, Midland, Mich., assignors to The Dow Chemical Company, Midland, Mich.
No Drawing. Continuation-in-part of application Ser. No. 652,732, July 12, 1967, which is a continuation-in-part of application Ser. No. 407,578, Oct. 29, 1964. This application Oct. 25, 1968, Ser. No. 770,780
The portion of the term of the patent subsequent to Dec. 10, 1985, has been disclaimed
Int. Cl. C08g 23/00
U.S. Cl. 260—849
35 Claims

ABSTRACT OF THE DISCLOSURE

A resinous material is produced by reacting a mercapto-alkanol with epihalohydrin polymers or epihalohydrin copolymers in the presence of a base. The products of the reaction are useful as resin intermediates. Epichlorohydrin copolymer-mercapto alkanol products are useful as protective colloids for aqueous dispersions of synthetic resins. They can be reacted with aminoplast resins to produce thermoset resins and they can be reacted with polyisocyanates to produce polyurethane resins and foams.

This application is a continuation-in-part of application Ser. No. 652,732 filed July 12, 1967, now issued as U.S. 3,415,902, which was a continuation-in-part of application Ser. No. 407,578 filed Oct. 29, 1964, now abandoned.

This invention relates to a new resinous material consisting of the reaction product of an epihalohydrin polymer or copolymer and a mercapto-alkanol.

The homopolymerization of an epihalohydrin or is copolymerization with alkylene oxides, is well known to the art. The homo- or copolymerization of epihalohydrin is generally initiated by traces of water, glycerol or other polyfunctional compounds which are either incidently present in the epihalohydrin or are deliberately added for that purpose. The polymerization reaction can be catalyzed by a Friedel-Crafts catalyst such as $BF_3$ etherate. The resulting polymers may either be homopolymers, random copolymers or block copolymers which correspond substantially to the structural formula

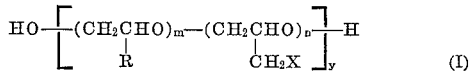

(I)

wherein R is hydrogen, a lower alkyl group containing from 1 to 4 carbon atoms, a phenoxymethyl group and an alkyl substituted phenoxy methyl group wherein the alkyl groups contain from 1 to 12 carbon atoms, $m$ may be 1 or may vary in different reaction products from 0 to more than 1, $n$ is one or more, $y$ is one or more, and X is halogen, usually chlorine, bromine or iodine.

It is to be understood that the homo- or copolymer chain may contain a poly functional radical derived from the poly functional compound which may be used as an initiator for the polymerization.

The molecular weight of the epihalohydrin homopolymer or copolymer prepared with a Friedel-Crafts type catalyst will generally vary from a few hundred to several thousand. If extremely high molecular weights i.e. above 100,000 are desired, the polymers can be prepared with the aid of a metal alkyl catalyst such as triethyl-aluminum or a $FeCl_3$ propylene oxide complex as described in U.S. 2,706,189.

It may be seen from the above Formula I that the epihalohydrin homo- or copolymer is a polyhalopolyether having pendant halogenated alkyl groups attached to the polymer chain. These halogenated alkyl groups are reacted with substituted mercapto-alkanols represented by the formula

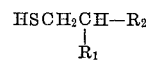

wherein $R_1$ is hydrogen or an hydroxyl group, $R_2$ is hydrogen, an alkyl group containing 1 to 4 carbon atoms, a hydroxy methyl group, an arylthiomethyl group containing 7–11 carbon atoms, an alkoxymethyl group containing 2 to 19 carbon atoms, an aryloxymethyl group containing 7–11 carbon atoms, and an alkylthiomethyl group containing 2 to 19 carbon atoms, with the proviso that at least one of $R_1$ and $R_2$ is or contains a hydroxy group to prepare the compositions of the present invention, which correspond substantially to the formula

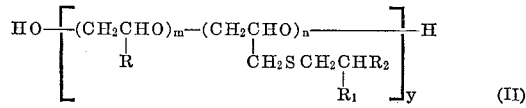

(II)

where R, $R_1$, $R_2$, $m$, $n$ and $y$ are as above defined. As aforementioned, the composition may additionally contain a minor amount of the residue of a poly functional compound used to initiate the polymerization of the epihalohydrin polymer.

Epihalohydrins used in preparing the aforesaid epihalohydrin polymers and copolymers of the present invention include epichlorohydrin, epibromohydrin and epiiodohydrin. In view of its availability and low cost epichlorohydrin is preferred.

Alkylene oxides which may be reacted with epihalohydrin to prepare the epihalohydrin copolymers of the present invention are ethylene oxide, propylene oxide, butylene oxide, isobutylene oxide, phenyl glycidyl ether, butylglycidyl ether, octadecylglycidyl ether, trimethylene oxide, tetrahydrofuran and the like.

Catalysts which may be employed to prepare the epihalohydrin polymers of the present invention include those of the Friedel-Crafts type, including anhydrous $AlCl_3$, $BF_3$, $ZnCl_2$, $FeCl_3$, $SnCl_4$, and complexes such as the well known $BF_3$ etherates, etc. and acid type catalysts including HF, $H_2SO_4$, $H_3PO_4$, $H_3PO_2$ and the like, and combinations thereof.

The concentration of catalyst may be varied, depending upon the individual catalyst. For example, from about 0.01 percent to about 2 percent of $BF_3$ or a complex thereof, based upon the total quantity of reactants, provide satisfactory results. Generally, from about 0.05 to about 0.5 percent by weight based on the weight of the reactants is preferred.

Suitable poly functional initiating compounds for the polymerization reaction include water, ethylene glycol, diethylene glycol, 1,2-propylene glycol, 1,6-hexanediol, glycerol, sucrose and the like.

In making the products of the present invention the epihalohydrin polymer or copolymer is first prepared by charging the monomer or mixture of monomers together with the catalyst, and if required, a suitable poly functional initiator, into a closed reaction vessel and the heat of reaction maintained at 20° to 160° C., preferably at 30° to 120° C., until polymerization is complete. Advantageously the catalyst and initiator is added to the reaction vessel first and the monomer or mixture of monomers is slowly added to the reaction vessel over a period of time depending on the quantity charged accompanied with the addition of additional catalyst as required at regular intervals.

The crude product resulting from the polymerization or copolymerization process, in addition to containing the desired epihalohydrin polymer may contain residual unreacted monomer. This crude material is warmed and subjected to reduced pressure to vaporize off the unreacted monomer.

In the second step of the process the so prepared epihalohydrin polymer is preferably dissolved along with the mercapto-alkanol and a base in an inert organic diluent such as a lower alkyl alcohol such as methanol, ethanol, or isopropanol, dimethylformamide, glycols, glycol ethers, and N-methyl pyrrolidone, in which the metal halide salt which forms is insoluble, and the reaction mixture is heated at 25° to 150° C., preferably 40° to 90° C., the time required depending on the charge. The bases that can be used are the alkali metals, alkali metal alcoholates, alkali-metal hydroxides, alkali metal carbonates, quaternary ammonium compounds such as tetramethyl ammonium hydroxide, and tertiary amines, such as pyridine, quinaldine, quinuclidine and triethyl amine. If the prepared epihalohydrin polymer is a solid, it can be dissolved in the aforementioned inert organic diluents or in an excess of the mercapto-alkanols. If the prepared epihalohydrin polymer is a liquid as used herein for purposes of illustration, the use of solvents can be dispensed with and the polymer can be dissolved in an amount of the mercapto-alkanol, based on the halogen in the polymer, which ranges from about 0.05 of the equivalent weight to about ten times the equivalent weight of the halogen. Thus, in either event, the polymer can be dissolved and reacted in the mercapto-alkanol if the amount present of the latter is in the range from about 0.05 of an equivalent amount to an excess amount. The amount of base used is ordinarily that required on an equivalent basis equal to the amount of halogen to be replaced. If the mercapto-alkanol is used on a basis equivalent to the amount of halogen to be replaced an excess of base may be used, although it is desirable not to use more than about a ten percent excess of base. Preferably the base and mercapto-alkanol used are the stoichiometric quantities required to displace the desired amount of halogen. The amount of halogen replaced can vary from 5–100% of theory. The amount of halogen replaced will depend on the properties desired in the end product. The reaction mixture is then filtered to remove the insoluble metal halide salt and the product recovered by vaporization or other convenient means for removal of the diluent.

The products of the present invention are, in general, viscous liquids substantially insoluble in water but are generally soluble in many organic solvents including lower alkyl alcohols such as methanol, ketones such as acetone and chlorinated hydrocarbons such as methylene chloride depending on the epihalohydrin polymer and mercapto-alkanol employed. They are valuable resin intermediates because of their high functionality and their high reactivity. For example, the products of the present invention may be reacted with aminoplast to obtain useful thermoset resins and they may be reacted with polyisocyanates to produce polyurethane type resins and foams. The lack of readily hydroylzable groups in such resins provides resins which exhibit excellent resistance to the action of water, acid, and alkalies. The epihalohydrin copolymer-mercapto-alkanol reaction products are useful as protective colloids for aqueous suspensions of polymers.

The present invention is illustrated more particularly by way of the following examples, but as will be more apparent, is not limited to the details thereof.

EXAMPLE 1

To a two liter three-necked flask fitted with a stirrer, Dry Ice condenser, dropping funnel, and a thermowell was charged 71.6 grams of ethylene glycol, 0.5 gram $H_3PO_2$ and 1.5 milliliters of $BF_3.Et_2O$. A solution of 300 grams of epichlorohydrin (20 percent of total monomer charge) and 1200 grams of propylene oxide (80 percent of total monomer charge) was slowly added over a 20 hour period while the temperature was maintained below 30° C. An additional total of 4.5 grams of $BF_3.Et_2O$ and 1.8 grams of $H_3PO_2$ was added at regular intervals. The mixture was then evaporated under reduced pressure (10 mm.) to remove unreacted monomer. The final product which was a brown, viscous liquid, weighed 1325 grams, had a chlorine content of 6.7 percent and a chlorine equivalent weight of 530.

The copolymer was reacted with 2-mercapto-ethanol by charging 0.25 equivalent each of copolymer, 2-mercaptoethanol and sodium hydroxide with 85 grams of isopropyl alcohol to a reaction flask and the mixture stirred at 60° C. for two hours. At the end of this period of time, the reaction mixture was filtered at reduced pressure and a tan colored liquid was recovered. Titration of an aliquot of the sodium chloride filter cake indicated that displacement of the chlorine from the epichlorohydrin copolymer was essentially quantitive.

A polyurethane foam was prepared by mixing 13 grams of the above reaction product with 7 grams of a polyisocyanate having the general formula

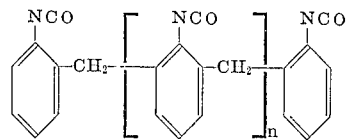

wherein $n$ is an average of approximately one, the product having an isocyanate equivalent (dibutylamine) of about 133.5 and a minimum NCO content by weight of 31 percent, 7 grams monofluorotrichloromethane, 4 drops (approximately 0.2 gram) stannous octoate and 4 drops (approximately 0.2 gram) of a silicone oil cell size control agent in a paper cup and stirring the mixture until the reactants begin to foam, whereupon a semi-rigid foam was produced.

A series of copolymers of epichlorohydrin with varying proportions by weight of propylene oxide were made following the above described procedure. Table I below lists the products made, their chlorine content and their chlorine equivalent weight.

TABLE I

| Sample Number | Percent of total monomer charge | | | Chlorine equivalent weight |
|---|---|---|---|---|
| | Epichloro-hydrin | Propylene oxide | Chlorine | |
| A | 10 | 90 | 4.85 | 732 |
| B | 30 | 70 | 16.3 | 218 |
| C | 40 | 60 | 12.7 | 280 |

The epichlorohydrin copolymers listed in Table I were individually reacted with 2-mercaptoethanol following the procedure described above. The products were viscous liquids which ranged in color from light yellow to brown.

A polyurethane foam was prepared by mixing 13 grams of the reaction product of sample number B of Table I with 2-mercaptoethanol with 7 grams of the polyisocyanate prepolymer described above, 4 grams monofluorotrichloromethane, 2 drops (approximately 0.1 gram) stannous octoate and 4 drops of a silicone oil cell size control agent in a paper cup and stirring the mixture until the reactants began to form whereupon a hard foam was produced.

In a manner similar to the procedure given in Example I, the following reactants were reacted.

EXAMPLE 2

554 grams (.2 equivalents) of a copolymer of epichlorohydrin-ethylene oxide copolymer (25 moles epichlorohydrin to 75 moles of ethylene oxide)
156 grams (.2 eq.) 2-mercapto-ethanol
84 grams (2.1 eq.) sodium hydroxide
800 grams isopropyl alcohol The reaction gave a yield of 449 grams of a yellow, semi-viscous liquid which was soluble to the extent of 10% by weight in water. It was found that this resin could be used as a protective colloid or plasticizer for aqueous suspensions of polymers such as polyvinyl alcohol.

EXAMPLE 3

66.1 grams (0.5 equivalents) polyepichlorohydrin mol. weight about 450)
40.8 g. (0.25 eq.) 1-mercapto-3-butoxy-2-propanol
10.5 g. (0.26 eq.) sodium hydroxide
200 g. isopropyl alcohol The product was a clear, light brown free flowing liquid containing 7.65 sulfur and 9.3% hydroxyl. The yield of the product was 73 grams.

EXAMPLE 4

98.9 g. (1.0 eq.) polyepichlorohydrin 1050 mol. weight
18.0 g. (0.1 eq.) 1-mercapto-3-butylthio-2-propanol
4.2 g. (0.105 eq.) sodium hydroxide
200 g. isopropyl alcohol The product was a very pale yellow, very viscous liquid containing 1.65% sulfur and 4.1% hydroxyl.

EXAMPLE 5

49.5 g. (0.5 eq.) polyepichlorohydrin mol. weight 1050
11.5 g. (0.125 eq.) 1-mercapto-3-propanol
5.0 g. (0.125 eq.) sodium hydroxide
118.0 g. isopropyl alcohol The product was an off-white, very viscous liquid. The yield was 56.4 grams.

EXAMPLE 6

One equivalent each of 2-mercaptoethanol and NaOH was changed to a reaction flask together with 250 milliliters benzene and 150 milliliters ethanol and the materials reacted until 200 milliliters of the azeotrope diluent was removed at the azeotrope temperature. One equivalent of polyepichlorohydrin (92.5 grams) having a molecular weight of 450 dissolved in 100 milliliters of absolute ethanol was added to the reaction flask. The mixture was heated at reflux temperature for 4 hours, cooled and filtered to remove NaCl of which 0.9 equivalent was recovered. The remaining solution was evaporated under reduced pressure and viscous, tan oil was recovered.

A polyurethane foam was prepared by reacting 13 grams of the above reaction product with 14.1 grams of a polyisocyanate prepolymer formed from the reaction of oxypropylated glycerine with toluene diisocyanate, having a NCO content of 32 percent, 3 grams monofluorotrichloromethane, 3 drops (approximately 0.15 gram) stannous octoate and 4 drops of a silicon oil cell size control agent in a paper cup and stirring the mixture until the reactants began to form whereupon a rigid foam was produced.

EXAMPLE 7

A series of copolymers of epichlorohydrin with varying proportions by weight of phenylglycidyl ether were made following the procedure of Example 1 with the exception that the diethylene glycol initiator was not incorporated in the reaction mixture. Table II below lists the products made with their chlorine equivalent weight.

TABLE II

| | Percent of total monomer charge | | | |
| --- | --- | --- | --- | --- |
| Sample Number | Epichlorohydrin | Phenylglycidyl ether | Chlorine | Equivalent weight |
| 1 | 10 | 90 | 3.80 | 935 |
| 2 | 20 | 80 | 7.58 | 468 |
| 3 | 30 | 70 | 11.4 | 311 |
| 4 | 40 | 60 | 12.0 | 296 |

The epichlorohydrin copolymers listed in Table II were individually reacted with 2-mercaptoethanol following the procedure described above. The products were viscous liquids which ranged in color from light yellow to brown.

A film was prepared by mixing 10 grams of the reaction product of sample Number 2 of Table II with 2-mercaptoethanol with 2.5 grams of a polyisocyanate prepolymer formed from the reaction of oxypropylated glycerine with toluene diisocyanate, having an NCO content of 32 percent, and 3 drops (approximately 0.15 gram) of 2-dimethylaminoethanol. The mixture when spread on the surface of a steel panel and baked in an oven at 300° F. for 15 minutes cured to a clear, flexible hard film.

A film was also prepared by mixing 10 grams of the reaction product of sample Number 2 of Table II with 2-mercaptoethanol with 1.8 grams of Aerotex M-3 (a partially methylated melamine-formaldehyde condensate in the physical form of a clear viscous syrup at a concentration of 80 percent by weight of active ingredients. The syrup has a density of 10 pounds per gallon, a pH of 8.5–9 and is soluble in water in all proportions) and 4 drops (approximately 0.2 gram) of Cyzac 1010, a solution of p-toluene sulfonic acid. The mixture when spread on the surface of a steel panel and baked in an oven for 10 minutes at 300° F. cured to a clear, flexible film having a pencil hardness between F and HB. When the procedure was repeated with 3.6 grams of Aerotex M-3, the cured film had a pencil hardness between 2H and 3H.

The following examples illustrate the preparation of the reaction products of this invention without an inert diluent.

EXAMPLE 8

In a manner similar to the procedure given in Example I the following reactants were reacted:

112.2 grams (1 chlorine equivalent) of a polymer epichlorohydrin having a molecular weight of 450 and 31.63% chloride.
7.8 grams (0.1 mole) of mercaptoethanol and
4.0 grams (0.1 mole) of flake sodium hydroxide.

The polymer was added to a 500 cc. flask equipped with a stirrer and a source of nitrogen to maintain a nitrogen atmosphere. The mercapto-ethanol was added and the flask was heated to 67° C. Sodium hydroxide was slowly added over a period of forty five minutes and the temperature was maintained at 67° C. The reaction mixture was maintained at this temperature for an additional twelve hours. The resulting reaction mixture was cream colored.

The product was separated by adding 50 cc. of trichloroethylene and the resulting thin paste was filtered to remove the precipitated sodium chloride.

The resulting product yield was 118 grams of a cream colored viscous resin containing some water. The theoretical yield is 116 grams.

This example illlustrates the fact that one obtains the desired reaction product with no solvent and using only about one tenth the mercapto alkanol required to replace the available chloro groups on the epichlorohydrin polymer.

EXAMPLE 9

In a manner similar to Example 8, the following were reacted.

112.2 grams (1 chlorine equivalent) of a polymer of epichlorohydrin having a molecular weight of 450 and 31.63% chloride
78 grams (1 mole) mercaptoethanol
40 grams (1 mole) sodium hydroxide (in flake form)

The epichlorohydrin polymer and the mercaptoethanol were added to a 500 cc. flask and heated to 62° C. The sodium hydroxide was added in small portions over a period of four hours. The temperature was raised to 70° C. and heating was continued for two additional hours.

The product was recovered from the reaction mixture by water washing and drying to give a yield 140 grams of a brown colored viscous resin.

This example illustrates the fact that the desired reaction product can be obtained by using an stoichiometric of the mercapto-ethanol as the diluent for the reaction. Similar results are obtained when the higher molecular weight mercapto-alkanols set forth previously are used. The reaction products obtained by using no inert diluent are useful in the same manner as the reaction products obtained by using an inert diluent.

In place of epichlorohydrin as used in the preceding examples to prepare the compositions of the present invention there may be employed equivalent amounts of other epihalohydrins such as epibromohydrin and epiiodohydrin as well as equivalent amounts of other alkylene oxides such as ethylene oxide, butylene oxide and the like, while otherwise the procedure is the same as described in said examples. Likewise equivalent amounts of other mercapto-alkanols such as 1 - mercapto - 2, 3 - propanediol, 1 - mercapto - 2 - propanol, 1 - mercapto - 2 - butanol, 1 - mercapto - 2 - hexanol, 1 - mercapto - 3 - propoxy - 2 - propanol, 1 - mercapto - 3 - propylthio - 2 - propanol, 1 - mercapto - 3 - ethoxy - 2 - propanol, 1 - mercapto - 3 - ethylthio - 2 - propanol, 1 - mercapto - 3 - naphthyloxy - 2 - propanol, 1 - mercapto - 3 - phenylthio - 2 - propanol, 1 - mercapto - 3 - p - tolylthio - 2 - propanol, 1 - mercapto - 3 - napthylthio - 2 - propanol, 1 - mercapto - 3 - octadecycloxy - 2 - propanol, 1 - mercapto - 3 - phenoxy - 2 - propanol, 1 - mercapto - 3 - p - tolyloxy - 2 - propanol, 1 - mercapto - 3 - octadecylthio - 2 - propanol, 1 - mercapto - 3 - hexadecyloxy - 2 - propanol, 1 - mercapto - 3 - methoxy - 2 - propanol and 1 - mercapto - 3 - methylthio - 2 - propanol, may be reacted with the epihalohydrin polymers and copolymers to prepare the compositions of the present invention.

We claim:

1. A composition of matter comprising the reaction product of (A) a mercapto-alkanol of the formula

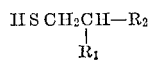

wherein $R_1$ is selected from the group consisting of hydrogen and hydroxy, $R_2$ is selected from the group consisting of hydrogen, an alkyl group containing 1 to 4 carbon atoms, a hydroxymethyl group, an arylthiomethyl group containing 7–11 carbon atoms, an aryloxymethyl group containing 7–11 carbon atoms, an alkoxymethyl group containing 2–19 carbon atoms, and an alkylthiomethyl group containing 2–19 carbon atoms with the proviso that at least one hydroxyl group is present on the molecule with (B) an epihalohydrin polymer selected from the group consisting of epihalohydrin homopolymers and epihalohydrin copolymers with an alkylene oxide, the amount of mercapto-alkanol being in the range from about 0.05 to an excess of the mercapto-alkanol equivalent of the halogen in said epihalohydrin polymer, said reaction product being formed by reacting components (A) and (B) in the presence of a base at a temperature in the range of from 25 to 150° C., the amount of base being at least about equivalent to the amount of halogen of said epihalohydrin polymer to be replaced and the base being capable of reacting with halide to form a salt of the halide and the base.

2. The composition of claim 1 wherein the epihalohydrin is epichlorohydrin.

3. The composition of claim 1 wherein the alkylene oxide is propylene oxide.

4. The composition of claim 1 wherein the alkylene oxide is ethylene oxide.

5. The composition of claim 1 wherein the alkylene oxide is phenyl glycidyl ether.

6. The composition of claim 1 wherein the mercapto-alkanol is 2-mercaptoethanol.

7. The composition of claim 1 wherein the mercapto-alkanol is 3-mercaptopropanol.

8. The composition of claim 1 wherein the mercapto-alkanol is 1-mercapto-3-butoxy-2-propanol.

9. The composition of claim 1 wherein the mercapto-alkanol is 1-mercapto-3-butylthio-2-propanol.

10. A film comprising the reaction product of the composition of claim 1 with a melamine formaldehyde resin.

11. A polyurethane resin comprising the reaction product of the composition of claim 1 with a polyisocyanate.

12. The composition of claim 1 wherein said reaction product is formed by reacting components (A) and (B) in an inert diluent in the presence of an alkali metal hydroxide at a temperature in the range of from 25 to 150° C.

13. The composition of claim 12 wherein the epihalohydrin is epichlorohydrin.

14. The composition of claim 12 wherein the alkylene oxide is propylene oxide.

15. The composition of claim 12 wherein the alkylene oxide is ethylene oxide.

16. The composition of claim 12 wherein the alkylene oxide is phenyl glycidyl ether.

17. The composition of claim 12 wherein the mercapto-alkanol is 2-mercaptoethanol.

18. The composition of claim 12 wherein the mercapto-alkanol is 3-mercaptopropanol.

19. The composition of claim 12 wherein the mercapto-alkanol is 1-mercapto-3-butoxy-2-propanol.

20. The composition of claim 12 wherein the mercapto-alkanol is 1-mercapto-3-butylthio-2-propanol.

21. A film comprising the reaction product of the composition of claim 12 with a melamine formaldehyde resin.

22. A polyurethane resin comprising the reaction product of the composition of claim 12 with a polyisocyanate.

23. The composition of claim 1 wherein said reaction product is formed by reacting components (A) and (B) in the presence of an alkali metal hydroxide and an amount of said mercapto-alkanol, ranging from about 0.05 equivalent amount to an excess amount based on halogen at a temperature in the range of from 25 to 150° C.

24. The composition of claim 23 wherein the epihalohydrin is epichlorohydrin.

25. The composition of claim 23 wherein the alkylene oxide is propylene oxide.

26. The composition of claim 23 wherein the alkylene oxide is ethylene oxide.

27. The composition of claim 23 wherein the alkylene oxide is phenyl glycidyl ether.

28. The composition of claim 23 wherein the mercapto-alkanol is 2-mercapto-ethanol.

29. The composition of claim 23 wherein the mercapto-alkanol is 3-mercapto-propanol.

30. The composition of claim 23 wherein the mercapto-alkanol is 1-mercapto-3-butoxy-2-propanol.

31. The composition of claim 23 wherein the mercapto-alkanol is 1-mercapto-3-butylthio-2-propanol.

32. A film comprising the reaction product of the composition of claim 23 with a melamine formaldehyde resin.

33. A polyurethane resin comprising the reaction product of the composition of claim 23 with a polyisocyanate.

34. A composition of matter comprising the reaction product of (A) a mercapto-alkanol of the formula

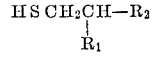

wherein $R_1$ is selected from the group consisting of hydrogen and hydroxy, $R_2$ is selected from the group consisting of hydrogen, an alkyl group containing 1 to 4 carbon atoms, a hydroxymethyl group, an arylthiomethyl group containing 7–11 carbon atoms, an aryloxymethyl group containing 7–11 carbon atoms, an alkoxymethyl group containing 2–19 carbon atoms, and an alkylthiomethyl group containing 2–19 carbon atoms with the proviso that at least one hydroxyl group is present on the molecule with (B) an epihalohydrin polymer selected from the group consisting of epihalohydrin homopolymers and epihalohydrin copolymers with an alkylene oxide having at least 1 epihalohydrin per 20 alkylene oxides, the amount of mercapto-alkanol being in the range from about 0.05 to about ten times the mercapto-alkanol equivalent of halogen in said epihalohydrin polymer, said reaction product being formed by reacting components (A) and (B) in the presence of a base at a temperature in the range of from 25° to 150° C., the amount of base being at least about equivalent to the amount of halogen to be replaced and the base being capable of reacting with halide to form a salt of the halide and the base.

35. A composition of matter comprising the reaction product of (A) a mercapto-alkanol of the formula

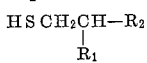

wherein $R_1$ is selected from the group consisting of hydrogen and hydroxy, $R_2$ is selected from the group consisting of hydrogen, an alkyl group containing 1 to 4 carbon atoms, a hydroxymethyl group, an alkoxymethyl group containing 2–19 carbon atoms, and an alkylthiomethyl group containing 2–19 carbon atoms with the proviso that at least one hydroxyl group is present on the molecule with (B) an epihalohydrin polymer selected from the group consisting of epihalohydrin homopolymers and epihalohydrin copolymers with an alkylene oxide having at least 1 epihalohydrin per 12 alkylene oxides, the amount of mercapto-alkanol being in the range from about 0.05 to about ten times the mercapto-alkanol equivalent of halogen in said epihalohydrin polymer, said reaction product being formed by reacting components (A) and (B) in the presence of a base at a temperature in the range of from 25° to 150° C., the amount of base being at least about equivalent to the amount of halogen to be replaced and the base being capable of reacting with halide to form a salt of the halide and the base.

References Cited
UNITED STATES PATENTS

| | | | |
|---|---|---|---|
| 2,619,508 | 11/1952 | Mikeska et al. | 260—609 |
| 3,341,491 | 9/1967 | Robinson et al. | 260—79 |
| 3,415,902 | 12/1968 | Hickner et al. | 260—849 |
| 3,417,060 | 12/1968 | Breslow | 260—79 |
| 3,474,045 | 10/1969 | Vandenberg et al. | 260—79 |

JOHN C. BLEUTGE, Primary Examiner

U.S. Cl. X.R.

117—132, 161; 260—2, 2.5, 77.5, 79